United States Patent
Ishizu

(10) Patent No.: US 8,670,074 B2
(45) Date of Patent: Mar. 11, 2014

(54) PROJECTOR, PROJECTION METHOD, AND STORAGE MEDIUM STORING PROGRAM

(75) Inventor: Takeo Ishizu, Higashimurayama (JP)

(73) Assignee: Casio Computer Co., Ltd, Tokyo (JP)

( * ) Notice: Subject to any disclaimer, the term of this patent is extended or adjusted under 35 U.S.C. 154(b) by 0 days.

(21) Appl. No.: 13/603,555

(22) Filed: Sep. 5, 2012

(65) Prior Publication Data

US 2013/0057769 A1    Mar. 7, 2013

(30) Foreign Application Priority Data

Sep. 7, 2011    (JP) .................................. 2011-194751

(51) Int. Cl.
*H04N 5/21*    (2006.01)
(52) U.S. Cl.
USPC .......................................... 348/625; 348/606
(58) Field of Classification Search
USPC ........................................................ 348/625
See application file for complete search history.

(56) References Cited

U.S. PATENT DOCUMENTS

2008/0239094 A1* 10/2008 Baqai et al. ................. 348/223.1
2009/0317049 A1* 12/2009 Adachi et al. .................... 386/52

FOREIGN PATENT DOCUMENTS

JP    2011-091618    5/2011

* cited by examiner

*Primary Examiner* — Jefferey Harold
*Assistant Examiner* — Justin Sanders
(74) *Attorney, Agent, or Firm* — Turocy & Watson, LLP

(57) ABSTRACT

A projector includes an input unit which inputs an image signal, a projection unit which projects an achromatic luminance image and a chromatic image on the basis of the image signal input by the input unit, an image processing unit which performs a sharpening processing to emphasize a high-frequency component in the image signal in accordance with a sharpening parameter to the image signal input by the input unit, and a projection control unit which controls a luminance image projection time of the luminance image for the chromatic image projected in the projection unit, a value of the sharpening parameter and the luminance image projection time being associated with each other.

18 Claims, 4 Drawing Sheets

| SUPER-RESOLUTION PARAMETER | WHITE PEAKING LEVEL |
|---|---|
| 10 | 6 |
| 9 | 7 |
| 8 | 7 |
| 7 | 7 |
| 6 | 8 |
| 5 | 8 |
| 4 | 8 |
| 3 | 9 |
| 2 | 9 |
| 1 | 9 |
| 0 | 10 |

…

PROJECTOR, PROJECTION METHOD, AND STORAGE MEDIUM STORING PROGRAM

CROSS-REFERENCE TO RELATED APPLICATIONS

This application is based upon and claims the benefit of priority under 35 USC 119 of Japanese Patent Application No. 2011-194751, filed Sep. 7, 2011, the entire disclosure of which, including the description, claims, drawings, and abstract, is incorporated herein by reference in it entirety.

BACKGROUND OF THE INVENTION

1. Field of the Invention

The present invention relates to a projector suitable as, for example, a Digital Light Processing (DLP) (registered trademark) projector, a projection method, and a storage medium storing a program.

2. Description of the Related Art

In Jpn. Pat. Appln. KOKAI Publication No. 2011-091618, there is disclosed a constitution in which when a resolution of an input image signal is below a resolution of an image projected by a projector, the input image signal is subjected to super-resolution processing which is a resolution interpolating technology to compensate for the resolution.

However, when the input image signal is subjected to the above super-resolution processing, a noise component of the projected image is emphasized sometimes.

Moreover, in a DLP (registered trademark) projector, processing called white peaking is possible in which a ratio of a time to project a luminance image, i.e., white (an achromatic luminance image) in a projected image is increased to enhance the luminance of the image.

In this white peaking processing, some defects occur sometimes. For example, the noise component in the projected image is amplified, and gradation representation becomes unnatural.

When the image signal having the resolution enhanced by use of the above super-resolution technology is subjected to the above white peaking processing, the noise component emphasized by the super-resolution technology is further emphasized by the white peaking processing. Therefore, a quality of the projected image deteriorates, and hence, for example, the unnaturalness of the gradation representation might occur.

The technology disclosed in the above patent document cannot avoid such quality deterioration, and in addition, there has not been suggested yet a technology which can prevent the deterioration of the image quality in the case where the image obtained by the super-resolution processing is subjected to the white peaking processing.

BRIEF SUMMARY OF THE INVENTION

According to one aspect of the present invention, there is provided a projector comprising: an input unit which inputs an image signal; a projection unit which projects an achromatic luminance image and a chromatic image on the basis of the image signal input by the input unit; an image processing unit which performs a sharpening processing to emphasize a high-frequency component in the image signal in accordance with a sharpening parameter to the image signal input by the input unit; and a projection control unit which controls a luminance image projection time of the luminance image for the chromatic image projected in the projection unit, a value of the sharpening parameter and the luminance image projection time being associated with each other.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of a case where the present invention is applied to a DLP (registered trademark) data projector will be described with reference to the drawings.

Figure 1:
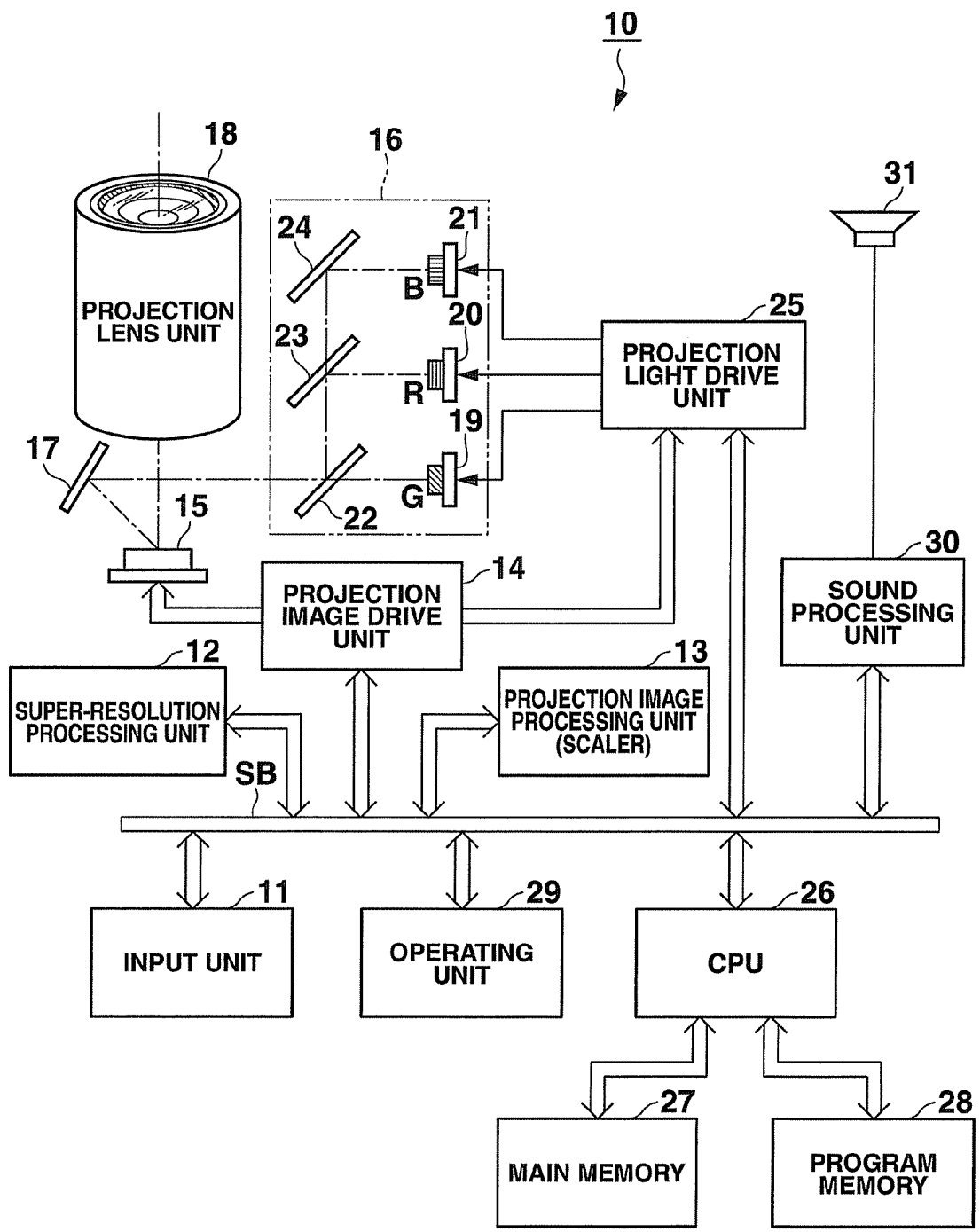
FIG. 1 is a block diagram showing a constitution of a functional circuit of a data projector according to an embodiment of the present invention.

FIG. 1 is a block diagram showing a schematic functional constitution of a data projector 10 according to the present embodiment. In the drawing, reference number 11 is an input unit. This input unit 11 includes, for example, a pin-jack (RCA) video input terminal, a D-sub15 RGB input connector, an image/sound input connector conforming to the High-Definition Multimedia Interface (HDMI) standard, and a Universal Serial Bus (USB) connector. The input unit inputs an image signal and a sound signal from an external apparatus wire-connected through one of these terminals.

The image signals of various standards input through the input unit 11 are input into a super-resolution processing unit 12 through a system bus SB. The super-resolution processing unit 12 performs interpolation processing so that the input image signal matches a predetermined image size suitable for projection. Furthermore, the super-resolution processing unit 12 subjects a texture portion in the image signal to image quality improvement processing, and subjects a contour portion of the texture portion to edge emphasis processing, to perform super-resolution processing which is sharpening processing to emphasize a high-frequency component.

Thus, the super-resolution processing unit 12 avoids the formation of a blurry image by simply averaging interpolation processing to realize high definition, and outputs the obtained image signal to a projection image processing unit 13 usually referred to as the scaler.

The projection image processing unit 13 conforms the input image signal to an image signal complying with a predetermined format suitable for the projection, and arbitrarily writes the signal in an incorporated buffer memory for display. Afterward, the unit arbitrarily reads the written image signal at a timing under consideration of white peaking, and sends the signal to a projection image drive unit 14.

In this case, if necessary, data such as a symbol indicating each operation state for an on-screen display (OSD) is also superimposed on the image signal in the buffer memory of the projection image processing unit 13. Then, the processed image signal is read and sent to the projection image drive unit 14.

On response to the sent image signal, the projection image drive unit 14 displays and drives a micromirror element 15 by higher speed time-sharing drive with a frame rate complying with a predetermined format, for example, 60 frames per second, in which a color component division number and a display gradation number are multiplied.

The micromirror element 15 performs at high speed an on/off operation of each tilt angle of, for example, WXGA (1280 horizontal pixels×768 vertical pixels) micromirrors arranged in an array state, to accomplish a display operation, hence forming an optical image by the resultant reflected light.

On the other hand, a light source section 16 circularly emits light of white (W), red (R), green (G) and blue (B) in the time-shared manner. The light from the light source section 16 is totally reflected by a mirror 17 to be applied to the micromirror element 15.

Then, the optical image is formed by the resultant reflected light from the micromirror element 15. The formed optical image is projected and displayed on an unshown screen which is a projection object through a projection lens unit 18.

The light source section 16 includes an LD (hereinafter referred to as "the G-LD") 19 which emits the green (G) light, a light emitting diode (hereinafter referred to as "the R-LED") 20 which emits the red (R) light, and an LD (hereinafter referred to as "the B-LD") 21 which emits the blue (B) light.

The green light emitted by the G-LD 19 is transmitted through a dichroic mirror 22 and then sent to the mirror 17.

The red light emitted by the R-LED 20 is reflected by a dichroic mirror 23, also reflected by the dichroic mirror 22, and then sent to the mirror 17.

The blue light emitted by the B-LD 21 is reflected by a mirror 24, transmitted through the dichroic mirror 23, reflected by the dichroic mirror 22, and then sent to the mirror 17.

The dichroic mirror 22 transmits the green light, but reflects the red light and the blue light. The dichroic mirror 23 reflects the red light, but transmits the blue light.

Thus, light emission timings, drive signal waveforms and the like of the G-LD 19, the R-LED 20 and the B-LD 21 of the light source section 16 are integrally controlled by a projection light drive unit 25. The projection light drive unit 25 controls light emitting operations of the G-LD 19, the R-LED 20 and the B-LD 21 in accordance with a timing signal synchronized with the image signal sent from the projection image drive unit 14, and control of a CPU 26 described later.

Additionally, in the present embodiment, the G-LD 19, the R-LED 20 and the B-LD 21 are used, but all the red, green and blue light sources may be LEDs or LDs, and needless to say, the green light may be generated by irradiating a fluorescent screen with an excitation light.

All operations of the above circuits are controlled by the CPU 26. The CPU 26 is directly connected to a main memory 27 and a program memory 28. The main memory 27 is constituted of, for example, an SRAM, and functions as a work memory of the CPU 26. The program memory 28 is constituted of an electrically rewritable nonvolatile memory such as a flash ROM, and stores an operation program to be executed by the CPU 26, various fixed-form data including a super-resolution parameter (a sharpening parameter)/white peaking level corresponding table described later, and others.

It is to be noted that the above super-resolution parameter in the super-resolution processing includes various change settings of, for example, a gain value indicating an intensity of a super-resolution effect, an edge threshold value indicating a portion corresponding to the super-resolution processing, and an image regulating filter which becomes an index of intensity of blur improvement.

The CPU 26 reads the operation program, the fixed-form data or the like stored in the program memory 28, and develops and stores the program, data or the like in the main memory 27 to execute the program, whereby the data projector 10 is integrally controlled.

The CPU 26 performs various projection operations in accordance with a key operation signal from an operating unit 29.

The operating unit 29 includes a remote controller light receiving portion which receives an infrared modulation signal from an unshown remote controller for exclusive use in the data projector 10, and a key input portion disposed in, for example, the upper surface of a housing of the data projector 10.

The operating unit 29 outputs the key operation signal to the CPU 26 on the basis of a key operated with the remote controller for exclusive use in the data projector 10 or the key input portion of a main body by a user.

The CPU 26 is further connected to a sound processing unit 30 via the system bus SB.

The sound processing unit 30 includes a sound source circuit such as a PCM sound source, and converts a sound signal given at the projection operation to an analog signal, drives a speaker 31 to emit a sound, or generates a beep sound or the like if necessary.

Additionally, in the constitution of the above embodiment, it has been described that the image signal input through the input unit 11 is subjected to the super-resolution processing in the super-resolution processing unit 12, to perform high-definition processing involving the emphasizing of the high-frequency component, and then the processed image signal is output to the projection image processing unit 13. However, as the order of the processing, the super-resolution processing unit 12 may be disposed after the projection image processing unit 13.

Next, an operation of the above embodiment will be described.

The following operation is performed on the basis of the control of the CPU 26 at usual image projection. The CPU 26 reads the operation program or data stored in the program memory 28, and develops and stores the program or data in the main memory 27 to execute the operation program.

Figures 2, 3:
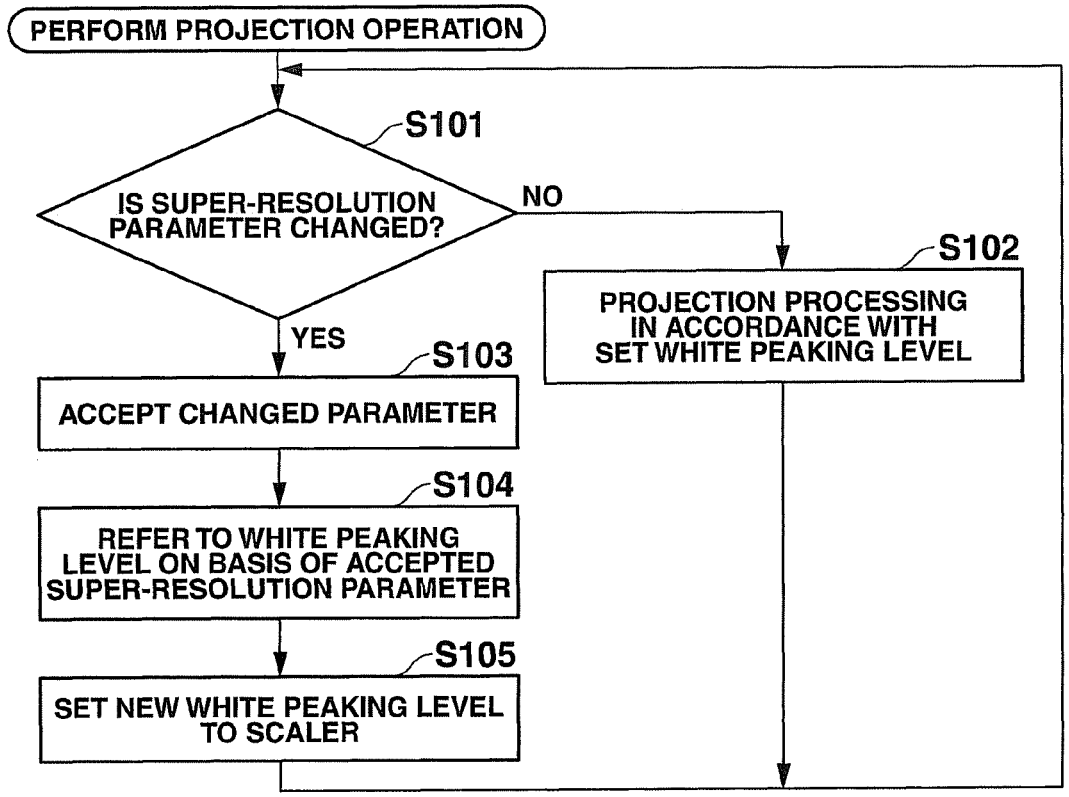
FIG. 2 is a flowchart showing processing contents mainly corresponding to setting of a super-resolution parameter and a white peaking level according to the embodiment.
FIG. 3 is a diagram showing a table of the white peaking level corresponding to the parameter of super-resolution processing according to the embodiment.

FIG. 2 shows processing by the CPU 26 in a state where a power source is turned on, and the image signal is input through the input unit 11 to perform the projection operation. In the beginning of the processing, the CPU 26 determines whether or not an instructing operation to change the super-resolution parameter of the super-resolution processing performed by the super-resolution processing unit 12 has been performed (step S101).

The instructing operation to change the super-resolution parameter includes, for example, the instructing of various change settings of the gain value indicating the intensity of the super-resolution effect, the edge threshold value indicating the portion corresponding to the super-resolution processing, the image regulating filter which becomes the index of the intensity of the blur improvement and the like, from menu items.

When it is determined in step S101 that the instructing operation to change the super-resolution parameter is not performed, the CPU 26 carries out the projection operation including a white (W) field having a length corresponding to the white peaking level set at this time (step S102), to return to the processing of step S101 again.

Figure 4:
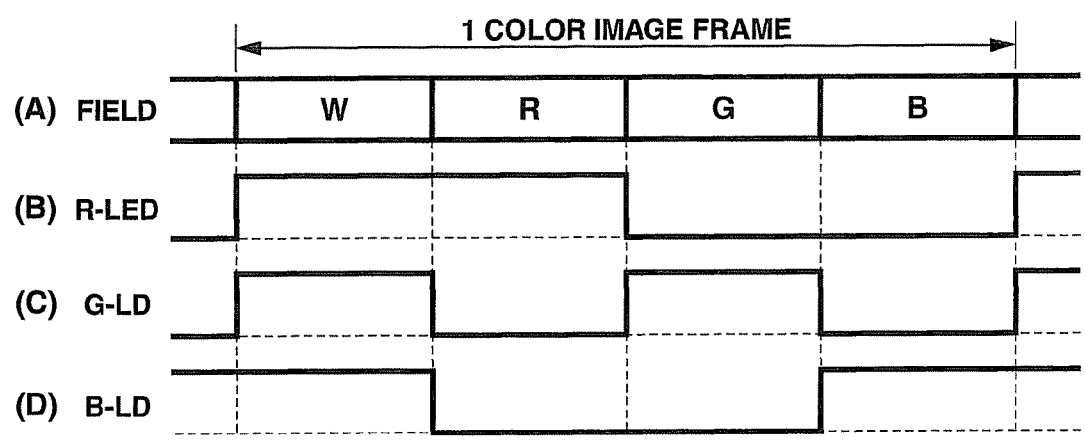
FIG. 4 is a timing chart showing a standard arrangement example of color fields constituting one color image frame and light emission timings of color light sources according to the embodiment.

FIG. 4 illustrates the light emission timings of the R-LED 20, the G-LD 19 and the B-LD 21 of the light source section 16, when four fields constituting one color image frame, i.e., a W-field, an R-field, a G-field and a B-field have the same time width.

As shown in the diagram, in the W-field, the light is simultaneously emitted by the R-LED 20, the G-LD 19 and the B-LD 21, to obtain the white light (a luminance image) by color mixture. At this time, the micromirror element 15 displays the image corresponding to a luminance signal Y by matrix calculation $Y=0.2988R+0.5868G+0.1144B$. Then, the optical image is formed by the reflected light, and projected toward the not-shown screen which is the projection object through the projection lens unit 18.

Subsequently, in each of the R-field, G-field, and B-field, each of the R-LED 20, the G-LD 19 and the B-LD 21 emits the light alone, whereby an R-image, a G-image and a B-image which are primary color images (chromatic images) are successively projected.

When the white peaking level can be varied, a time width of the W-field in the one color image frame is increased/decreased, that is, a time to project the luminance image, i.e., white (the achromatic luminance image) in the projected image (the luminance image projection time) is increased/decreased, so that the luminance of the projected image can be changed.

Moreover, when it is determined in step S101 that the instructing operation to change the super-resolution parameter is performed, the CPU 26 accepts change conditions by the instructing operation. Then, the CPU 26 accepts the change conditions (step S103), and refers to the white peaking level on the basis of an accepted new super-resolution parameter (S104).

FIG. 3 is an example of a table showing a correspondence between the super-resolution parameter and the white peaking level, and beforehand stored in the program memory 28. Here, the super-resolution parameter has eleven stages of "10" to "0", whereas the white peaking level is divided into five stages in a range of "6" to "10" to correspond to the parameters.

It is to be noted that in the present embodiment, when the super-resolution parameter is "10", the image signal is most intensely subjected to the super-resolution processing, and as the value of the super-resolution parameter becomes lower, the image signal is more weakly subjected to the super-resolution processing. Moreover, when the white peaking level is "10", the image signal is most intensely subjected to the white peaking, and as the white peaking level becomes lower, the image signal is more weakly subjected to the white peaking.

As shown, when the super-resolution parameter is high and a higher-definition sharp quality of image is projected, the white peaking level is lowered. In consequence, a noise component included in an original image signal is not conspicuous, and gradation representation is prevented from becoming unnatural.

Moreover, in the present embodiment, when the super-resolution processing is not performed, i.e., when the super-resolution parameter shown in FIG. 3 is "0", the noise of the projected image by the super-resolution processing does not have to be taken into consideration, and hence control is executed so that the white peaking level is maximized to "10".

Thus, the corresponding white peaking level is read from the table and set to the projection image processing unit 13 (step S105), and then the step returns to the processing from step S101.

Figure 5:
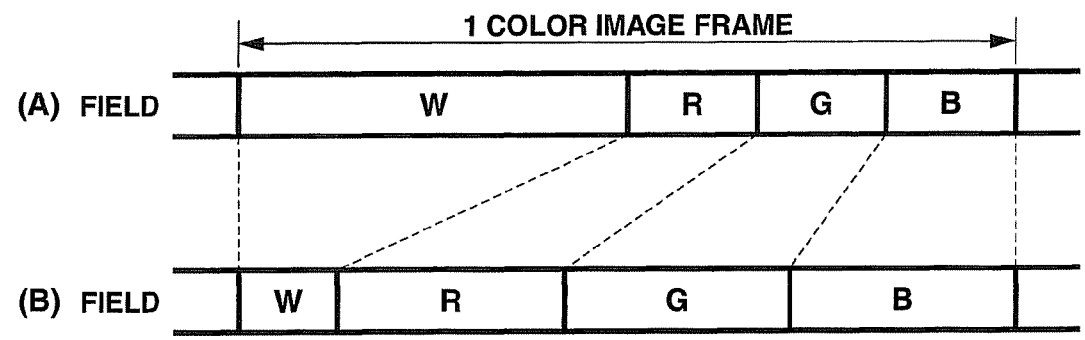
FIG. 5 is a timing chart showing an arrangement example of the respective color fields constituting the one color image frame according to the embodiment.

FIG. 5 shows a field constitution example in accordance with the white peaking level. In (A) of FIG. 5, the white peaking level is high, and a period of the W-field is set to be noticeably longer than that of each of the other R-field, G-field and B-field.

Therefore, the present invention is suitable for the case where image brightness is considered to be more important than color, for example, when making a presentation in a bright meeting room. At this time, the super-resolution parameter is suppressed to be low as described above, and hence the noise in the image signal is not emphasized and is not conspicuous.

Conversely, in (B) of FIG. 5, the white peaking level is low, and the period of the W-field is set to be shorter than that of each of the other R-field, G-field and B-field.

Therefore, the present invention is suitable for the case where color balance of the image is considered to be more important than the simple brightness, for example, when seeing a movie in dimmed illumination. At this time, since the super-resolution parameter is set to be high as described above, it is possible to enjoy the high-definition image.

According to the present embodiment described above in detail, it is possible to suppress the deterioration of the image quality, when the image obtained by the super-resolution processing is subjected to the white peaking processing.

Moreover, in the above embodiment, as the value of the super-resolution parameter increases and a degree to emphasize the high-frequency component in the image signal increases, the white peaking level is lowered. Therefore, it is possible to securely prevent the noise included in the image signal from being improperly conspicuous.

Furthermore, in the above embodiment, the time width of the W-field to project the luminance image is regulated in accordance with the white peaking level, and hence the gradation of contrast in the image can precisely be represented.

Additionally, in the above embodiment, there has been described the case where the white peaking level can be varied in accordance with the super-resolution parameter by the super-resolution processing unit 12. However, the present invention is not restricted to the super-resolution processing to increase the number of constitutional pixels, and can similarly be applied to the sharpening processing to emphasize the high-frequency component in the image signal, and image processing such as edge emphasis processing.

Moreover, in the present embodiment, when the super-resolution processing is not performed, the control is executed so that the white peaking level is maximized to "10". However, when the super-resolution processing is not performed, the noise of the projected image by the super-resolution processing does not have to be taken into consideration, and hence there may be employed a constitution where the white peaking level can arbitrarily be set by the user.

Furthermore, in the present embodiment, the white peaking level can automatically be varied in accordance with the set super-resolution parameter, but the CPU 26 may include a constitution where an upper limit of the white peaking level is limited in accordance with the super-resolution parameter.

That is, in the table of FIG. 3, when the super-resolution parameter is "8", the corresponding white peaking level is "7", and in this case, the white peaking level cannot be set to a value larger than "7". However, there may be employed a constitution where the white peaking level can be set to a value smaller than "7".

In such a constitution, the setting of the white peaking level can be provided with a degree of freedom. Therefore, the noise of the projected image can be decreased, and the projection can be performed in accordance with user's taste as compared with the above embodiment.

Furthermore, in the present embodiment, the white peaking level can be varied in accordance with the set super-resolution parameter, but there may be employed a constitution where the super-resolution parameter can be varied in accordance with the set white peaking level.

Hereinafter, another operation example of the present embodiment will briefly be described.

Figure 6:
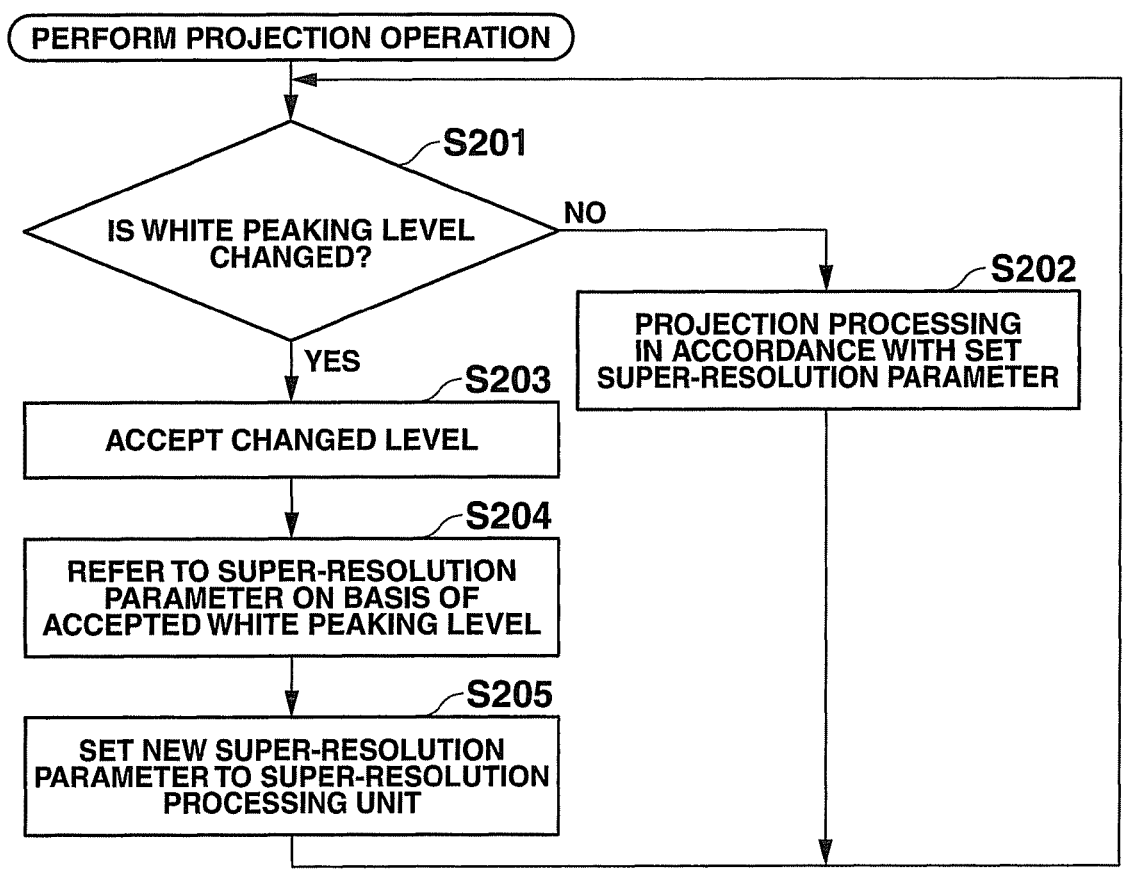
FIG. 6 is a flowchart showing, as another operation example according to the embodiment, processing contents mainly corresponding to setting of the white peaking level and the super-resolution parameter.

FIG. 6 shows processing by the CPU 26 in a state where a power source is turned on, and an image signal is input through the input unit 11 to perform a projection operation. In the beginning of the processing, the CPU 26 determines whether or not an instructing operation to change a white peaking level has been performed by the projection image processing unit 13 (step S201).

The instructing operation to change the white peaking level includes, for example, the instructing from menu items.

When it is determined in step S201 that the instructing operation to change the white peaking level is not performed, the CPU 26 performs a projection operation including an operation of the super-resolution processing unit 12 in accordance with the super-resolution parameter set at the time point (step S202), and returns to the processing of step S201 again.

Moreover, when it is determined in step S201 that the instructing operation to change the white peaking level is performed, the CPU 26 accepts change conditions by the instructing operation. Then, the CPU 26 accepts the change conditions (step S203), the super-resolution parameter in, for example, the above-mentioned table shown in FIG. 3 is referred on the basis of the accepted new white peaking level (step S204).

In the table showing the correspondence between the super-resolution parameter and the white peaking level, when the super-resolution parameter is higher and a higher-definition sharp quality image is projected, the white peaking level is lowered. Therefore, the noise component included in the original image signal is not conspicuous, and gradation representation is prevented from becoming unnatural.

Thus, the corresponding super-resolution parameter is read from the table and set to the super-resolution processing unit 12 (step S205), and then the processing returns to the processing from step S201.

In this way, the super-resolution parameter is arbitrarily set in accordance with the level of the white peaking processing, and hence it is possible to perform the white peaking processing after performing the super-resolution processing as required, without incurring the deterioration of the image quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projector comprising:
an input unit which inputs an image signal;
a projection unit which projects an achromatic luminance image and a chromatic image on the basis of the image signal input by the input unit;
an image processing unit which performs a sharpening processing to emphasize a high-frequency component in the image signal in accordance with a sharpening parameter to the image signal input by the input unit; and
a projection control unit which controls a luminance image projection time of the luminance image for the chromatic image projected in the projection unit, a value of the sharpening parameter and the luminance image projection time being associated with each other.

2. The projector according to claim 1, wherein:
the image processing unit performs the sharpening processing in accordance with the sharpening parameter set, and
the projection control unit controls the luminance image projection time on the basis of the sharpening parameter set.

3. The projector according to claim 2, wherein the projection control unit shortens the luminance image projection time, as the value of the sharpening parameter increases and an emphasizing degree of the high-frequency component increases.

4. The projector according to claim 2, wherein the projection control unit limits a length of the luminance image projection time on the basis of the sharpening parameter.

5. The projector according to claim 1, wherein:
the projection control unit controls the luminance image projection time of the luminance image for the chromatic image in accordance with the luminance image projection time set, and
the image processing unit performs the sharpening processing to emphasize the high-frequency component in the image signal in accordance with the sharpening parameter determined on the basis of the luminance image projection time set.

6. The projector according to claim 5, wherein the image processing unit lowers the value of the sharpening parameter and lowers the emphasizing degree of the high-frequency component, as the luminance image projection time becomes longer.

7. The projector according to claim 5,
wherein the image processing unit limits an upper limit of the sharpening parameter on the basis of the luminance image projection time.

8. The projector according to claim 1, wherein:
the projection unit includes color light sources, and simultaneously lights the color light sources to obtain the light source for the achromatic luminance image, and
the projection control unit controls the luminance image projection time of the luminance image for the chromatic image.

9. A projection method for use in an apparatus including an input unit which inputs an image signal, and a projection unit which projects an achromatic luminance image and a chromatic image on the basis of the image signal input by the input unit, the method comprising:
- performing an image processing process of performing a sharpening processing to emphasize a high-frequency component in the image signal in accordance with a sharpening parameter to the image signal input by the input unit; and
- performing a projection control process of controlling a luminance image projection time of the luminance image for the chromatic image projected by the projection unit, a value of the sharpening parameter and the luminance image projection time being associated with each other.

10. The projection method according to claim 9, wherein:
- performing the image processing process includes performing the sharpening processing in accordance with the sharpening parameter set, and
- performing the projection control process includes controlling the luminance image projection time on the basis of the sharpening parameter set.

11. The projection method according to claim 10, wherein performing the projection control process includes shortening the luminance image projection time, as the value of the sharpening parameter increases and an emphasizing degree of the high-frequency component increases.

12. The projection method to claim 9, wherein:
- performing the projection control process includes controlling the luminance image projection time of the luminance image for the chromatic image in accordance with the luminance image projection time set, and
- performing the image processing process includes performing the sharpening processing to emphasize the high-frequency component in the image signal in accordance with the sharpening parameter determined on the basis of the luminance image projection time set.

13. The projection method according to claim 12, wherein performing the image processing process includes lowering the value of the sharpening parameter and lowering the emphasizing degree of the high-frequency component, as the luminance image projection time becomes longer.

14. A non-transitory computer-readable storage medium having program code stored thereon for controlling a computer as an apparatus including an input unit which inputs an image signal, and a projection unit which projects an achromatic luminance image and a chromatic image on the basis of the image signal input by the input unit, to carry out the functions of:
- performing an image processing process of performing a sharpening processing to emphasize a high-frequency component in the image signal in accordance with a sharpening parameter to the image signal input by the input unit; and
- performing a projection control process of controlling a luminance image projection time of the luminance image for the chromatic image projected by the projection unit, a value of the sharpening parameter and the luminance image projection time being associated with each other.

15. The storage medium according to claim 14, wherein:
- performing the image processing process includes performing the sharpening processing in accordance with the sharpening parameter set, and
- performing the projection control process includes controlling the luminance image projection time on the basis of the sharpening parameter set.

16. The storage medium according to claim 15, wherein performing the projection control process includes shortening the luminance image projection time, as the value of the sharpening parameter increases and an emphasizing degree of the high-frequency component increases.

17. The storage medium according to claim 14, wherein:
- performing the projection control process includes controlling the luminance image projection time of the luminance image for the chromatic image in accordance with the luminance image projection time set, and
- performing the image processing process includes performing the sharpening processing to emphasize the high-frequency component in the image signal in accordance with the sharpening parameter determined on the basis of the luminance image projection time set.

18. The storage medium according to claim 17, wherein performing the image processing process includes lowering the value of the sharpening parameter and lowering the emphasizing degree of the high-frequency component, as the luminance image projection time becomes longer.

* * * * *